US008842844B2

(12) United States Patent
Crockett

(10) Patent No.: US 8,842,844 B2
(45) Date of Patent: *Sep. 23, 2014

(54) SEGMENTING AUDIO SIGNALS INTO AUDITORY EVENTS

(71) Applicant: Dolby Laboratories Licensing Corporation, San Francisco, CA (US)

(72) Inventor: Brett G. Crockett, Brisbane, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,089

(22) Filed: Jun. 17, 2013

(65) Prior Publication Data

US 2013/0279704 A1    Oct. 24, 2013

Related U.S. Application Data

(63) Continuation of application No. 12/724,969, filed on Mar. 16, 2010, now Pat. No. 8,488,800, which is a (Continued)

(51) Int. Cl.
| | | |
|---|---|---|
| *H04R 29/00* | (2006.01) | |
| *H04B 3/00* | (2006.01) | |
| *G06F 17/00* | (2006.01) | |
| *H04N 5/60* | (2006.01) | |
| *G10L 15/04* | (2013.01) | |
| *G10L 17/26* | (2013.01) | |
| *H04N 5/04* | (2006.01) | |

(52) U.S. Cl.
CPC ... *H04R 29/00* (2013.01); *H04N 5/04* (2013.01); *H04N 5/60* (2013.01); *G10L 15/04* (2013.01); *G10L 17/26* (2013.01)
USPC .................. 381/56; 381/77; 381/80; 700/94

(58) Field of Classification Search
CPC .. H04R 29/00; H04R 29/008; H04S 2400/15; H04S 7/40
USPC ......................... 700/94; 381/94.1, 94.2, 94.3, 381/94.4–94.5, 56, 80, 58, 98; 704/501, 704/504
See application file for complete search history.

(56) References Cited

U.S. PATENT DOCUMENTS

| | | |
|---|---|---|
| 4,464,784 A | 8/1984 | Agnello |
| 4,624,009 A | 11/1986 | Glenn et al. |

(Continued)

FOREIGN PATENT DOCUMENTS

| | | |
|---|---|---|
| JP | H05-113797 | 5/1993 |
| JP | H06-175693 | 6/1994 |

(Continued)

OTHER PUBLICATIONS

U.S. Appl. No. 10/474,387, filed Oct. 7, 2003, Brett Graham Crockett—Jul. 6, 2007 Office Action.

(Continued)

*Primary Examiner* — Vivian Chin
*Assistant Examiner* — Douglas Suthers

(57) ABSTRACT

In one aspect, the invention divides an audio signal into auditory events, each of which tends to be perceived as separate and distinct, by calculating the spectral content of successive time blocks of the audio signal, calculating the difference in spectral content between successive time blocks of the audio signal, and identifying an auditory event boundary as the boundary between successive time blocks when the difference in the spectral content between such successive time blocks exceeds a threshold. In another aspect, the invention generates a reduced-information representation of an audio signal by dividing an audio signal into auditory events, each of which tends to be perceived as separate and distinct, and formatting and storing information relating to the auditory events. Optionally, the invention may also assign a characteristic to one or more of the auditory events. Auditory events may be determined according to the first aspect of the invention or by another method.

10 Claims, 5 Drawing Sheets

Related U.S. Application Data continuation of application No. 10/478,538, filed as application No. PCT/US02/05999 on Feb. 26, 2002, now Pat. No. 7,711,123, which is a continuation-in-part of application No. PCT/US02/04317, filed on Feb. 12, 2002, which is a continuation-in-part of application No. 10/045,644, filed on Jan. 11, 2012, now abandoned, which is a continuation-in-part of application No. 09/922,394, filed on Aug. 2, 2001, now abandoned, which is a continuation-in-part of application No. 09/834,739, filed on Apr. 13, 2001, now abandoned, application No. PCT/US02/05999, filed on Feb. 26, 2002, which is a continuation of application No. 10/045,644, filed on Jan. 11, 2012.

(60) Provisional application No. 60/351,498, filed on Jan. 23, 2002, provisional application No. 60/293,825, filed on May 5, 2001.

(56) References Cited

U.S. PATENT DOCUMENTS

| | | | |
|---|---|---|---|
| 4,700,391 | A | 10/1987 | Leslie, Jr. et al. |
| 4,703,355 | A | 10/1987 | Cooper |
| 4,723,290 | A | 2/1988 | Watanabe et al. |
| 4,792,975 | A | 12/1988 | MacKay |
| 4,829,872 | A | 5/1989 | Topic et al. |
| 4,852,170 | A | 7/1989 | Bordeaux |
| 4,864,620 | A | 9/1989 | Bialick |
| 4,905,287 | A | 2/1990 | Segawa |
| 5,023,912 | A | 6/1991 | Segawa |
| 5,040,081 | A | 8/1991 | McCutchen |
| 5,101,434 | A | 3/1992 | King |
| 5,175,769 | A | 12/1992 | Hejna, Jr. et al. |
| 5,202,761 | A | 4/1993 | Cooper |
| 5,216,744 | A | 6/1993 | Alleyne et al. |
| 5,235,646 | A | 8/1993 | Wilde et al. |
| 5,276,629 | A | 1/1994 | Reynolds |
| 5,313,531 | A | 5/1994 | Jackson |
| 5,450,522 | A | 9/1995 | Hermansky et al. |
| 5,621,857 | A | 4/1997 | Cole et al. |
| 5,634,020 | A * | 5/1997 | Norton .......................... 715/727 |
| 5,730,140 | A | 3/1998 | Fitch |
| 5,749,073 | A | 5/1998 | Slaney |
| 5,781,885 | A | 7/1998 | Inoue et al. |
| 5,828,994 | A | 10/1998 | Covell et al. |
| 5,862,228 | A | 1/1999 | Davis |
| 5,970,440 | A | 10/1999 | Veldhuis et al. |
| 6,002,776 | A | 12/1999 | Bhadkamkar et al. |
| 6,021,386 | A | 2/2000 | Davis et al. |
| 6,108,622 | A | 8/2000 | Xue |
| 6,163,614 | A | 12/2000 | Chen |
| 6,211,919 | B1 | 4/2001 | Zink et al. |
| 6,246,439 | B1 | 6/2001 | Zink et al. |
| 6,266,003 | B1 | 7/2001 | Hoek |
| 6,360,202 | B1 | 3/2002 | Bhadkamkar |
| 6,430,533 | B1 | 8/2002 | Kolluru et al. |
| 6,487,535 | B1 | 11/2002 | Smyth |
| 6,490,553 | B2 | 12/2002 | Van Thong et al. |
| 6,792,402 | B1 | 9/2004 | Chen |
| 6,835,885 | B1 | 12/2004 | Kondo |
| 6,990,443 | B1 * | 1/2006 | Abe et al. ....................... 704/222 |
| 7,092,774 | B1 | 8/2006 | Gifford |
| 7,171,367 | B2 | 1/2007 | Chang |
| 7,283,954 | B2 | 10/2007 | Crockett |
| 7,313,519 | B2 | 12/2007 | Crockett |
| 7,454,331 | B2 | 11/2008 | Vinton |
| 7,461,002 | B2 | 12/2008 | Crockett |
| 7,508,947 | B2 | 3/2009 | Smithers |
| 7,610,205 | B2 | 10/2009 | Crockett |
| 7,711,123 | B2 | 5/2010 | Crockett |
| 2001/0027393 | A1 | 10/2001 | Touimi et al. |
| 2001/0038643 | A1 | 11/2001 | McParland |
| 2002/0097882 | A1 | 7/2002 | Greenberg et al. |
| 2002/0116178 | A1 | 8/2002 | Crockett |
| 2004/0037421 | A1 | 2/2004 | Truman |
| 2004/0184537 | A1 | 9/2004 | Geiger et al. |
| 2005/0078840 | A1 | 4/2005 | Riedl |
| 2006/0002572 | A1 | 1/2006 | Smithers |
| 2007/0140499 | A1 | 6/2007 | Davis |

FOREIGN PATENT DOCUMENTS

| | | |
|---|---|---|
| JP | 10-145729 | 5/1998 |
| WO | 9841978 | 9/1998 |
| WO | 0103002 | 1/2001 |

OTHER PUBLICATIONS

U.S. Appl. No. 10/474,387, filed Oct. 7, 2003, Brett Graham Crockett—Sep. 20, 2007 Response to Office Action.

PCT/US02/04317, filed Feb. 12, 2002—International Search Report dated Oct. 15, 2002.

Laroche, Jean, "Autocorrelation Method for High-Quality Time/Pitch-Scaling," Telecom Paris, Departement Signal, 75634 Paris Cedex 13. France, email: laroche@sig.enst.fr.

Australian Patent Office—Feb. 19, 2007—Examiner's first report on application No. 2002248431.

Chinese Patent Office—Apr. 22, 2005—Notification of First Office Action for Application No. 02808144.7.

Chinese Patent Office—Dec. 9, 2005—Notification of Second Office Action for Application No. 02808144.7.

Malaysian Patent Office—Apr. 7, 2006—Substantive Examination Adverse Report—Section 30(1) / 30(2)) for Application No. PI 20021371.

U.S. Appl. No. 10/476,347, filed Oct. 28, 2003, Brett Graham Crockett—Feb. 12, 2007 Office Action.

U.S. Appl. No. 10/476,347, filed Oct. 28, 2003, Brett Graham Crockett—May 14, 2007 Response to Office Action.

PCT/US02/12957, filed Apr. 25, 2002—International Search Report dated Aug. 12, 2002.

Vanfin, et al., "Modifying Transients for Efficient Coding of Audio," IEEE, pp. 3285-3288, Apr. 2001.

Vanfin, et al., "Improved Modeling of Audio Signals by Modifying Transient Locations," pp. W2001-W2001-4, Oct. 21-24, 2001, New Paltz, New York.

Australian Patent Office—Feb. 26, 2007—Examiner's first report on application No. 2002307533.

Chinese Patent Office—May 13, 2005—Notification of First Office Action for Application No. 02809542.1.

Chinese Patent Office—Feb. 17, 2006—Notification of Second Office Action for Application No. 02809542.1.

European Patent Office—Dec. 19, 2005—Communication Pursuant to Article 96(2) for EP Application No. 02 769 666.5-2218.

Indian Patent Office—Jan. 3, 2007—First Examination Report for Application No. 1308/KOLNP/2003—J.

U.S. Appl. No. 10/478,397, filed Nov. 20, 2003, Brett G. Crockett—Feb. 27, 2007 Office Action.

U.S. Appl. No. 10/478,397, filed Nov. 20, 2003, Brett G. Crockett—May 29, 2007 Response to Office Action.

PCT/US02/05329, filed Feb. 22, 2002—International Search Report dated Oct. 7, 2002.

Edmonds, et al., "Automatic Feature Extraction from Spectrograms for Acoustic-Phonetic Analysis," pp. 701-704, Lutchi Research Center, Loughborough University of Technology, Loughborough, U.K.

Chinese Patent Office—Mar. 10, 2006—Notification of the First Office Action for Application No. 02810670.9.

U.S. Appl. No. 10/478,398, filed Nov. 20, 2003, Brett G. Crockett—Feb. 27, 2007 Office Action.

U.S. Appl. No. 10/478,398, filed Nov. 20, 2003, Brett G. Crockett—May 29, 2007 Response to Office Action.

U.S. Appl. No. 10/478,398, filed Nov. 20, 2003, Brett G. Crockett—Jul. 20, 2007 Office Action.

U.S. Appl. No. 10/478,398, filed Nov. 20, 2003, Brett G. Crockett—Oct. 19, 2007 Request for Continued Examination with attached IDS.

U.S. Appl. No. 10/478,398, filed Nov. 20, 2003, Brett G. Crockett—Jan. 30, 2008 Office Action.

(56) References Cited

OTHER PUBLICATIONS

PCT/US02/05806, filed Feb. 25, 2002—International Search Report dated Oct. 7, 2002.
Chinese Patent Office—Nov. 5, 2004—Notification of First Office Action for Application No. 02810672.5.
Chinese Patent Office—Aug. 26, 2005—Notification of Second Office Action for Application No. 02810672.5.
European Patent Office—Aug. 10, 2004—Communication pursuant to Article 96(2) EPC for Application No. 02 707896.3-1247.
European Patent Office—Dec. 16, 2005—Communication pursuant to Article 96(2) EPC for Application No. 02 707 896.3-1247.
Indian Patent Office—Oct. 10, 2006—First Examination Report for Application No. 01490/KOLNP/2003.
Indian Patent Office—May 29, 2007—Letter for Application No. 01490/KOLNP/2003.
Indian Patent Office—Aug. 10, 2007—Letter for Application No. 01490/KOLNP/2003.
Japanese Patent Office—Partial Translation of Office Action received Oct. 5, 2007.
PCT/US02/05999, filed Feb. 26, 2002—International Search Report dated Oct. 7, 2002.
Fishbach, Alon, Primary Segmentation of Auditory Scenes, IEEE, pp. 113-117, 1994.
Australian Patent Office—Mar. 9, 2007—Examiner's first report on application No. 2002252143.
Chinese Patent Office—Dec. 31, 2004—Notification of the First Office Action for Application No. 02810671.7.
Chinese Patent Office—Jul. 15, 2005—Notification of Second Office Action for Application No. 02810671.7.
Chinese Patent Office—Apr. 28, 2007—Notification of Third Office Action for Application No. 02810671.7.
Indian Patent Office—Nov. 23, 2006 First Examination Report for Application No. 01487/KOLNP/2003—G.
Indian Patent Office—Jul. 30, 2007 (Aug. 2, 2007) Letter from the Indian Patent Office for Application No. 01487/KOLNP/2003—G.
U.S. Appl. No. 10/591,374, filed Aug. 31, 2006, Mark Franklin Davis—Pending claims in application.
PCT/US2005/006359, filed Feb. 28, 2005—International Search Report and Written Opinion dated Jun. 6, 2005.
ATSC Standard: Digital Audio Compression (AC-3), Revision A, Doc A/52A, ATSC Standard, Aug. 20, 2001, pp. 1-140.
Schuijers, E., et al.; "Advances in Parametric Coding for High-Quality Audio," Preprints of Papers Presented at the AES Convention, Mar. 22, 2003, pp. 1-11, Amsterdam, The Netherlands.
European Patent Office—Sep. 28, 2007—Examination Report for Application No. 05 724 000.4-2225.
European Patent Office—Jan. 26, 2007—Communication pursuant to Article 96(2) EPC for Application No. 05 724 000.4-2218.
SG 200605858-0 Singapore Patent Office Written Opinion dated Oct. 17, 2007 based on PCT Application filed Feb. 28, 2005.
U.S. Appl. No. 10/911,404, filed Aug. 3, 2004, Michael John Smithers—Oct. 5, 2006 Office Action.
U.S. Appl. No. 10/911,404, filed Aug. 3, 2004, Michael John Smithers—Jan. 5, 2007 Response to Office Action.
U.S. Appl. No. 10/911,404, filed Aug. 3, 2004, Michael John Smithers—Mar. 28, 2007 Office Action.
U.S. Appl. No. 10/911,404, filed Aug. 3, 2004, Michael John Smithers—Jun. 28, 2007 RCE and Response to Office Action.
U.S. Appl. No. 10/911,404, filed Aug. 3, 2004, Michael John Smithers—Aug. 10, 2007 Office Action.
U.S. Appl. No. 10/911,404, filed Aug. 3, 2004, Michael John Smithers—Dec. 7, 2007 Response to Office Action.
PCT/US2005/024630, filed Jul. 13, 2005—International Search Report and Written Opinion dated Dec. 1, 2005.
U.S. Appl. No. 11/999,159, filed Dec. 3, 2007, Alan Jeffrey Seefeldt, et al.—Pending claims in application.
PCT/US2006/020882, filed May 26, 2006—International Search Report and Written Opinion dated Feb. 20, 2007.

Faller, Christof, "Coding of Spatial Audio Compatible with Different Playback Formats," Audio Engineering Society Convention Paper, presented at the 117.sup.th Convention, pp. 1-12, Oct. 28-31, 2004, San Francisco, CA.
Herre, et al., "MP3 Surround: Efficient and Compatible Coding of Multi-Channel Audio," Audio Engineering Society Convention Paper, presented at the 116.sup.th Convention, pp. 1-14, May 8-11, 2004 Berlin, Germany.
Fielder, et al., "Introduction to Dolby Digital Plus, an Enhancement to the Dolby Digital Coding System," Audio Engineering Society Convention Paper; presented at the 117.sup.th Convention, pp. 1-29, Oct. 28-31, 2004 San Francisco, CA.
Herre, et al., "Spatial Audio Coding: Next-Generation Efficient and Compatible Coding of Multi-Channel Audio," Audio Engineering Society Convention Paper, presented at the 117.sup.th Convention, pp. 1-13, Oct. 28-31, 2004 San Francisco, CA.
Faller, Christof, "Parametric Coding of Spatial Audio," These No. 3062, pp. 1-164, (2004) Lausanne, EPFL.
Herre, et al., "The Reference Model Architecture for MPEG Spatial Audio Coding," Audio Engineering Society Convention Paper, presented at the 118.sup.th Convention, pp. 1-13, May 28-31, 2005 Barcelona, Spain.
Schuijers, et al., "Low Complexity Parametric Stereo Coding," Audio Engineering Society Convention Paper, presented at the 116.sup.th Convention, pp. 1-11, May 8-11, 2004 Berlin, Germany.
PCT/US2006/028874, filed /24/06—Alan Jeffrey Seefeldt and Mark Stuart Vinton—Pending claims in application.
PCT/US2007/008313, filed Mar. 30, 2007—International Search Report and Written Opinion dated Sep. 21, 2007.
Blesser, B., "An Ultraminiature Console Compression System with Maximum User Flexibility," presented Oct. 8, 1971 at the 41.sup.st Convention of the Audio Engineering Society, New York, AES May 1972 vol. 20, No. 4, pp. 297-302.
Hoeg, W., et al., "Dynamic Range Control (DRC) and Music/Speech Control (MSC) Programme-Associated Data Services for DAB," EBU Review—Technical, European Broadcasting Union. Brussels, BE, No. 261, Sep. 21, 1994, pp. 56-70.
Chinese Patent Office—Feb. 15, 2008—Notification of Fourth Office Action for Application No. 02 81671.7.
Brandenburg, K., "MP3 and AAC Explained," Proceedings of the International AES Conference, 1999, pp. 99-110.
Carroll, Tim, "Audio Metadata: You Can Get There from Here," Oct. 11, 2004, pp. 1-4, Retrieved from the Internet: URL:http://tvtechnology.com/features/audio.sub.--notes/f-TC-metadta-8.21.- 02.shtml.
Painter, T., et al., "Perceptual Coding of Digital Audio", Proceedings of the IEEE, New York, NY, vol. 88, No. 4, Apr. 2000, pp. 451-513.
Swanson, M. D., et al., "Multiresolution Video Watermarking Using Perceptual Models and Scene Segmentation," Proceedings of the International Conference on Image Processing, Santa Barbara, CA, Oct. 26-29, 1997, Los Alamitos, CA IEEE Computer Society, US, vol. 2, Oct. 1997, pp. 558-561.
Todd, et al., "AC-3: Flexible Perceptual Coding for Audio Transmission and Storage," 96.sup.th Convention of the Audio Engineering Society, Preprint 3796, Feb. 1994, pp. 1-16.
Smith, et al., "Tandem-Free VoIP Conferencing: A Bridge to Next-Generation Networks," IEEE Communications Magazine, May 2003, pp. 136-145.
Riedmiller Jeffrey C., "Solving TV Loudness Problems Can You 'Accurately' Hear the Difference," Communications Technology, Feb. 2004.
Moore, B. C. J., et al., "A Model for the Prediction of Thresholds, Loudness and Partial Loudness," Journal of the Audio Engineering Society, New York, NY vol. 45, No. 4, Apr. 1, 1997, pp. 224-240.
Glasberg, B. R., et al., "A Model of Loudness Applicable to Time-Varying Sounds," Audio Engineering Society, New York, NY, vol. 50, No. 5, May 2002, pp. 331-342.
Hauenstein, M., "A Computationally Efficient Algorithm for Calculating Loudness Patterns of Narrowband Speech," Acoustics, Speech and Signal Processing, 1997, IEEE International Conference, Munich, Germany, Apr. 21-24, 1997, Los Alamitos, CA USE, IEEE Comput. Soc. US Apr. 21, 1997, pp. 1311-1314.
Trappe, W., et al., "Key Distribution fro Secure Multimedia Multicasts via Data Embedding," 2001 IEEE International Confer-

(56) References Cited

OTHER PUBLICATIONS ences on Acoustics, Speech and Signal Processing Proceedings, Salt Lake City UT, May 7-11, 2001 IEEE International Conference on Acoustics, Speech and Signal Processing, New York, NY, IEEE, US, vol. 1 of 6, May 7, 2001, pp. 1449-1452.
Foti, Frank, "DTV Audio Processing: Exploring the New Frontier," OMNIA, Nov. 1998, pp. 1-3.
Translation of Japanese Office Action issued in DOL098JP dated Feb. 3, 2009.
Klapuri, Anssi "Sound Onset Detection by Applying Psychoacoustic Knowledge" ICASSP, IEEE International Conference on Acoustics, Speech and Signal Processing—Proceedings 1999 IEEE, vol. 6, Mar. 15, 1999, pp. 3089-3092.
Scheirer, Eric D., "Tempo and Beat Analysis of Acoustic Musical Signals" The Journal of the Acoustical Society of America, American Institute of Physics for the Acoustical Society of America, New York, NY, US, vol. 103, No. 1, Jan. 1, 1998, pp. 588-601.
Masri, Paul, "Computer Modelling of Sound for Transformation and Synthesis of Musical Signals" Dec. 1, 1996, pp. 125-147.
Bregman, Albert S., "Auditory Scene Analysis—The Perceptual Organization of Sound," Massachusetts Institute of Technology, 1991, Fourth printer, 2001, Second MIT Press (Paperback ed.) 2.sup.nd, pp. 468-470.
Dattorro, J., "Effect Design Part I: Reverberator and Other Filters," 1997, J. Audio Eng. Soc., 45(9):660-684.
Dembo, A., et al., "Signal Synthesis from Modified Discrete Short-Time Transform," 1988, IEEE Trans Acoust., Speech, Signal Processing, ASSP 36(2):168-181.
Fairbanks, G., et al., "Method for Time or Frequency Compression-Expansion of Speech," 1954, IEEE Trans Audio and Electroacoustics, AU-2:7-12.
Griffin D., et al., "Multiband Excitation Vocoder," 1988, IEEE Trans. Acoust., Speech, Signal Processing, ASSP-36(2):236-243.
Laroche, J., "Autocorrelation Method for High Quality Time/Pitch Scaling," 1993, Procs. IEEE Workshop Appl. of Signal Processing to Audio and Acoustics, Mohonk Mountain House, New Paltz, NY.
Laroche J., et al., "HNS: Speech Modification Based on a Harmonic + Noise Model," 1993a, Proc. IEEE ECASSP-93, Minneapolis, pp. 550-553.
Laroche, J., "Time and Pitch Scale Modification of Audio Signals," Chapter 7 of "Applications of Digital Signal Processing to Audio and Acoustics," 1998, edited by Mark Kahrs and Karlheinz Brandenburg, Kluwer Academic Publishers.
Lee, F., "Time Compression and Expansion of Speech by the Sampling Method," 1972, J. Audio Eng. Soc., 20(9):738-742.
Lee, S., et al., "Variable Time-Scale Modification of Speech Using Transient Information," 1997, An IEEE Publication, pp. 1319-1322.
Lin, G.J., et al, "High Quality and Low Complexity Pitch Modification of Acoustic Signals," 1995, An IEEE Publication, pp. 2987-2990.
Makhoul, J., "Linear Predication: A tutorial Review," 1975, Proc. IEEE, 63(4):561-580.
Malah D., "Time-Domain Algorithms for Harmonic Bandwidth Reduction and Time Scaling of Speech Signals," 1979, IEEE Trans. on Acoustics, Speech, and Signal Processing ASSP-27(2):113-120.
Marques J., et al., "Frequency-Varying Sinusoidal Modeling of Speech," 1989, IEEE Trans. on Acoustics and Signal Processing, ASSP-37(5):763-765.
Moorer, J. A., "The Use of the Phase Vocoder in Computer Music Applications," 1978, J. Audio Eng. Soc., 26(1).
Press, William H., et al., "Numerical Recipes in C, The Art of Scientific Computing," 1988, Cambridge University Press, NY, pp. 432-434.
Portnoff, R., "Time-Scale Modifications of Speech Based on Short-Time Fourier Analysis," 1981, IEEE Trans. Acoust., Speech, Signal Processing 29(3):374-390.
Quatierei T., et al., "Speech Transformations Based on a Sinusoidal Representation," 1986, IEEE Trans on Acoustics, Speech and Signal Processing, ASSP-34(6):1449-1464.
Roehrig, C., "Time and Pitch Scaling of Audio Signals," 1990, Proc. 89.sup.th AES Convention, Los Angeles, Preprint 2954 (E-1).
Roucos, S., et al, "High Quality Time-Scale Modification of Speech," 1985, Proc. IEEE ICASSP-85, Tampa, pp. 493-496.
Shanmugan, K. Sam, "Digital and Analog Communication Systems," 1979, John Wiley & Sons, NY, pp. 278-280.
Schroeder, M., et al., "Band-Width Compression of Speech by Analytic-Signal Rooting," 1967, Proc. IEEE, 55:396-401.
Scott, R., et al., "Pitch-Synchronous Time Compression of Speech," 1972, Proceedings of the Conference for Speech Communication Processing, pp. 63-65.
Seneff, S., "System to Independently Modify Excitation and/or Spectrum of Speech Waveform without Explicit Pitch Extraction," 1982, IEEE Trans. Acoust., Speech, Signal Processing, ASSP-24:358-365.
Suzuki, R., et al., "Time-Scale Modification of Speech Signals Using Cross-Correlation Functions," 1992, IEEE Trans. on Consumer Electronics, 38(3):357-363.
Tan, Roland, K.C., "A Time-Scale Modification Algorithm Based on the Subband Time-Domain Technique for Broad-Band Signal Applications," May 2000, J. Audio Eng. Soc. vol. 48, No. 5, pp. 437-449.
Bristow-Johnson, Robert, "Detailed Analysis of a Time-Domain Formant-Corrected Pitch-Shifting Algorithm," May 1995, J. Audio Eng. Soc., vol. 43, No. 5, pp. 340-352.
George, E Bryan, et al., "Analysis-by-Synthesis/Overlap-Add Sinusoidal Modeling Applied to the Analysis and Synthesis of Musical Tones," Jun. 1992, J. Audio Eng. Soc., vol. 40, No. 6, pp. 497-515.
McAulay, Robert J., "Speech Analysis/Synthesis Based on a Sinusoidal Representation," Aug. 1986, IEEE Transactions on Acoustics, Speech and Signal Processing, vol. ASSP-34, No. 4, pp. 744-754.
Laroche, Jean, "Improved Phase Vocoder Time-Scale Modification of Audio," May 1999, IEEE Transactions on Speech and Audio Processing, vol. 7, No. 3, pp. 323-332.
Slyh, Raymond E., "Pitch and Time-Scale Modification of Speech: A Review of the Literature—Interim Report May 1994-May 1995," Armstrong Lab., Wright-Patterson AFB, OH, Crew Systems Directorate.
Audio Engineering Handbook, K. Blair Benson ed., McGraw Hill, San Francisco, CA 1988, pp. 1.40-1.42 and 4.8-4.10.
Tewfik, A.H., et al., "Enhanced Wavelet Based Audio Coder," Nov. 1, 1993, Signals, Systems and Computers, Conference Record of the 17.sup.th Asilomar Conference on Pacific Grove, CA, IEEE Comput. Soc pp. 896-900.
Vafin, R., et al., "Modifying Transients for Efficient Coding of Audio," May 2001, IEEE International Conference on Acoustics, Speech and Signal Processing, pp. 3285-3288, vol. 5.
Vafin, R., et al., Improved Modeling of Audio Signals by Modifying Transient Locations, Oct. 2001, Proceeding of the 2001 IEEE Workshop on the Applications of Signal Processing to Audio and Acoustics, pp. 143-146.
Karjalainen, M., et al., "Multi-Pitch and Periodcity Analysis Model for Sound Separation and Auditory Scene Analysis," Mar. 1999, Proc. ICASSP'99, pp. 929-932.
Levine, S .N., "Effects Processing on Audio Subband Data," 1996, Proc. Int. Computer Music Conf., HKUST, Hong Kong, pp. 328-331.
Levine, S. N., et al., "A Switched Parametric & Transform Audio Coder," Mar. 1999, Proc. ICASSP'99, pp. 985-988.
Mermelstein, P., et al., "Analysis by Synthesis Speech Coding with Generalized Pitch Prediction," Mar. 1999, Proc. ICASSP'99, pp. 1-4.
Pollard, M .P., et al, "Enhanced Shape—Invariant Pitch and Time-Scale Modification for Concatenative Speech Synthesis," Oct. 1996, Proc. Int. Conf. For Spoken Language Processing , ICLSP'96, vol. 3, pp. 1433-1436.
Verma, T. S., et al., An Analysis/Synthesis Tool for Transient Signals that Allows a Flexible Sines+Transients+Noise Model for Audio, May 1998, Proc. ICASSP'98, pp. 3573-3576.
Verma, T. S., et al., "Sinusoidal Modeling Using Frame-Based Perceptually Weighted Matching Pursuits," Mar. 1999 Proc. ICASSP'99, pp. 981-984.
Yim, S., et al., "Spectral Transformation for Musical Tones via Time Domain Filtering," Oct. 1997, Proc. 1997 IEEE Workshop on Applications of Signa Processing to Audio and Acoustics, pp. 141-144.

(56) References Cited

OTHER PUBLICATIONS

Edmonds, E. A., et al., "Automatic Feature Extraction from Spectrograms for Acoustic-Phonetic Analysis," 1992 vol. II, Conference B: Pattern Recognition Methodology and Systems, Proceedings, 11.sup.th IAPR International Conference on the Hague, Netherlands, USE, IEEE Computer Soc., Aug. 30, 1992, pp. 701-704.

Fishbach, Alon, "Primary Segmentation of Auditory Scenes," 12.sup.th IAPR International Conference on Pattern Recognition, Oct. 9-13, 1994, vol. III Conference C: Signal Processing, Conference D: Parallel Computing, IEEE Computer Soc., pp. 113-117.

Dolson, Mark, "The Phase Vocoder: A Tutorial," 1986, Computer Music Journal, 10(4):14-27.

Moulines, E., et al., "Pitch-Synchronous Waveform Processing Techniques for Text-to-Speech Synthesis Using Diphones," 1990, Speech Communication, 9(5/6):453-467.

Serra, X, et al., "Spectral Modeling Synthesis: A Sound Analysis/Synthesis System Based on a Deterministic Plus Stochastic Decomposition," 1990, in Proc. of Int. Computer Music Conf., pp. 281-284, San Francisco, Ca.

Truax, Barry, "Discovering Inner Complexity: Time Shifting and Transposition with a Real-Time Granulation Technique," 1994, Computer Music J., 18(2):38-48.

Crockett, et al., "A Method for Characterizing and Identifying Audio Based on Auditory Scene Analysis," AES Convention Paper 6416, presented at the 118.sup.th Convention May 28-32, 2005, Barcelona, Spain.

\* cited by examiner

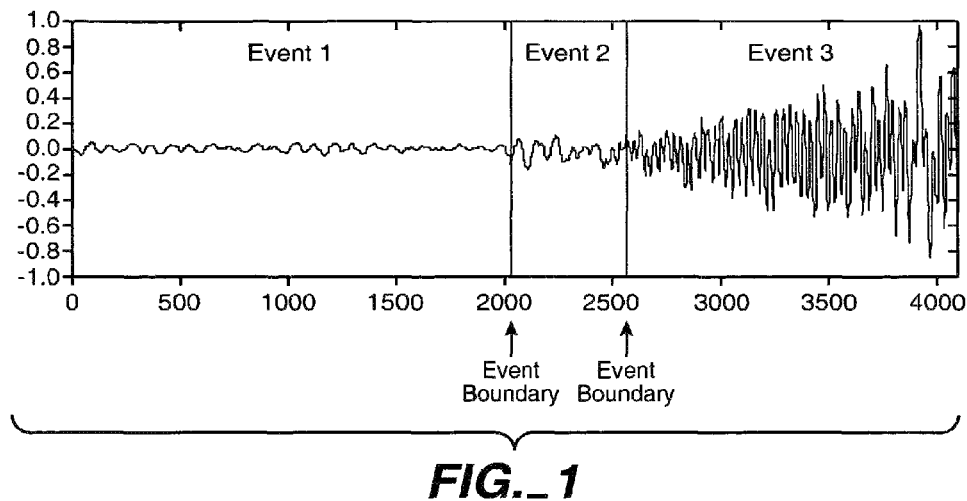
FIG._1
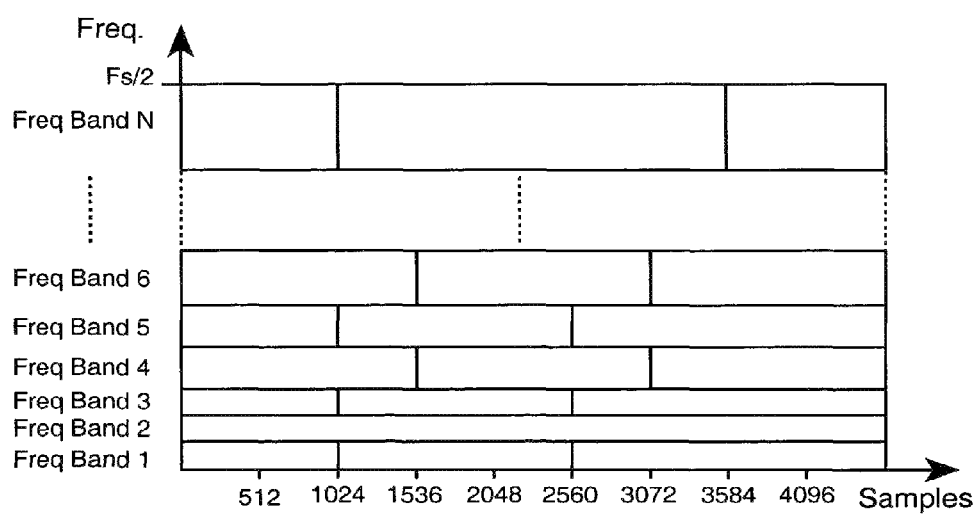
FIG._2

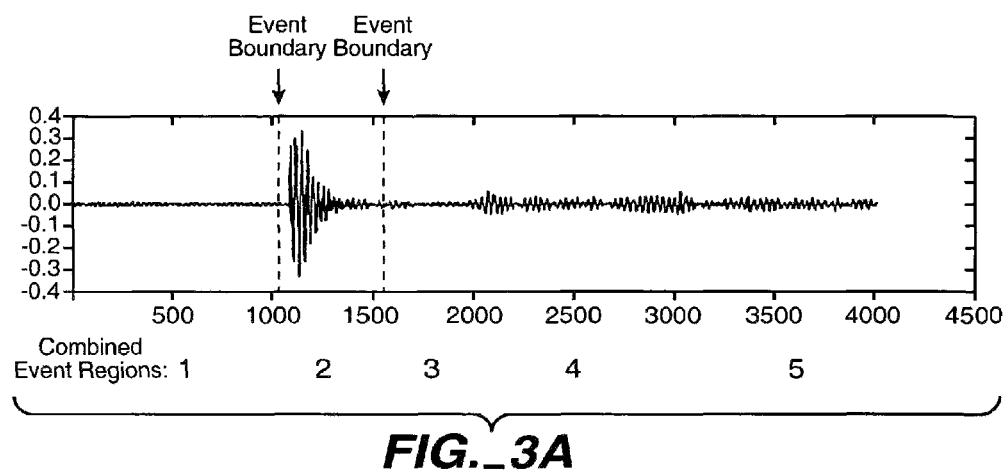
FIG._3A
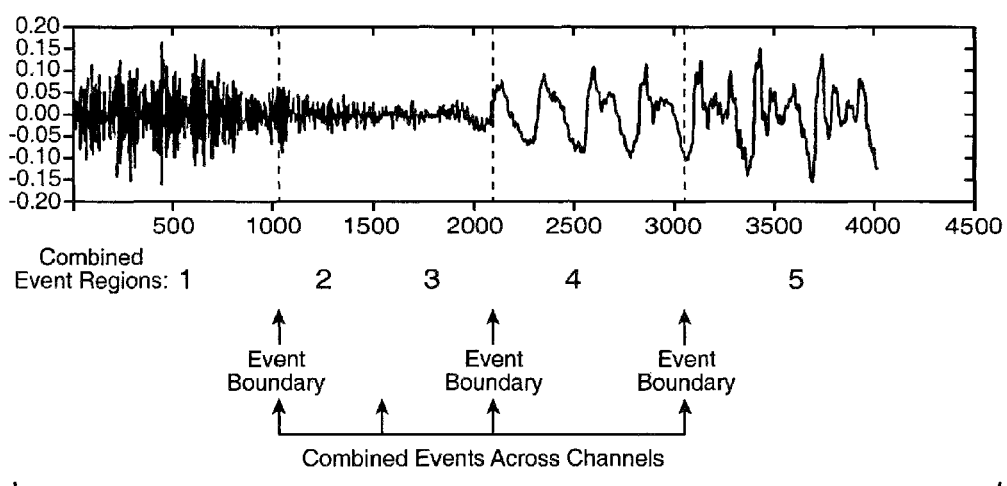
FIG._3B

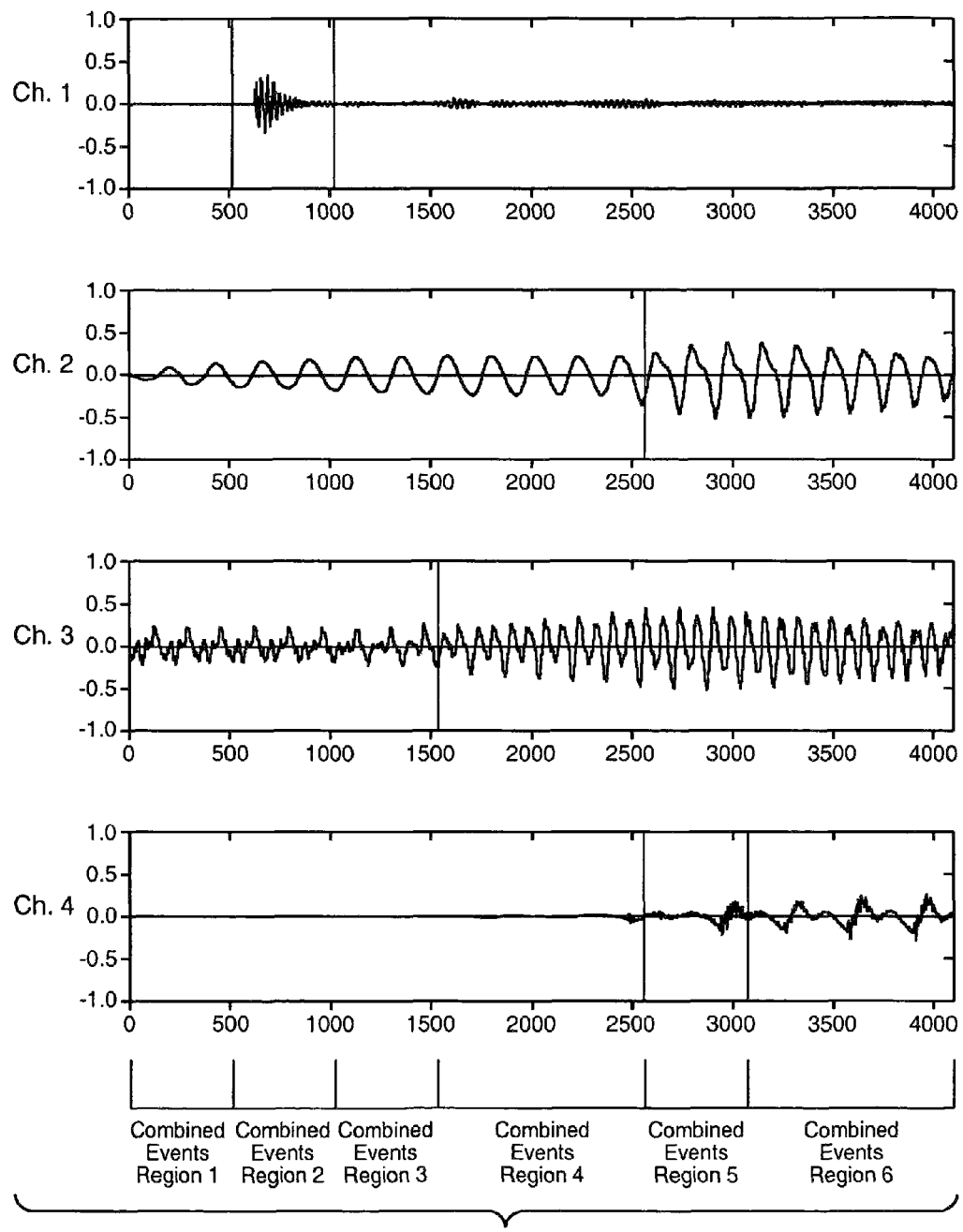
FIG._4

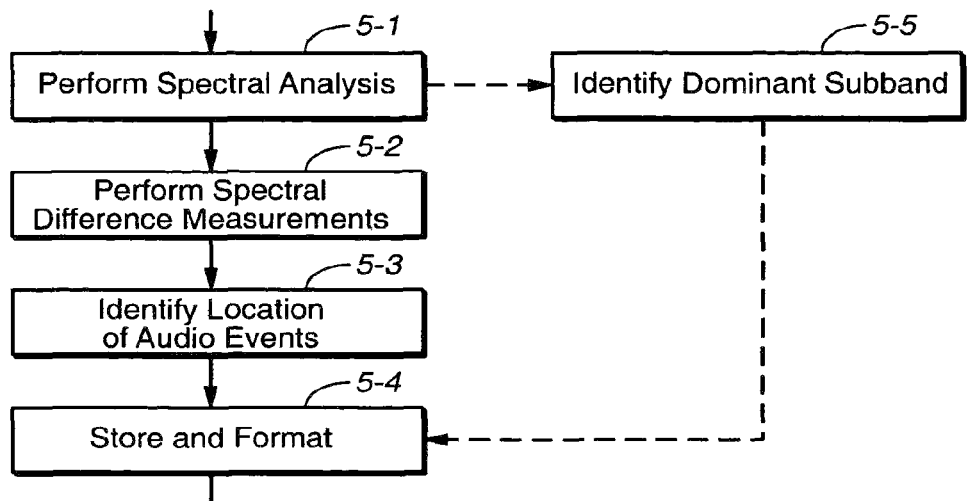
*FIG._5*
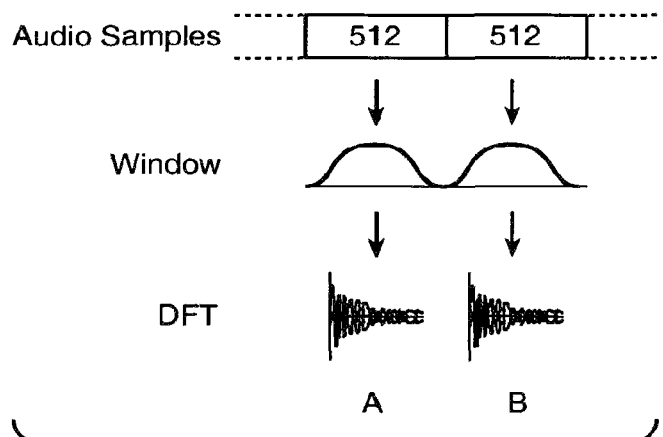
*FIG._6*

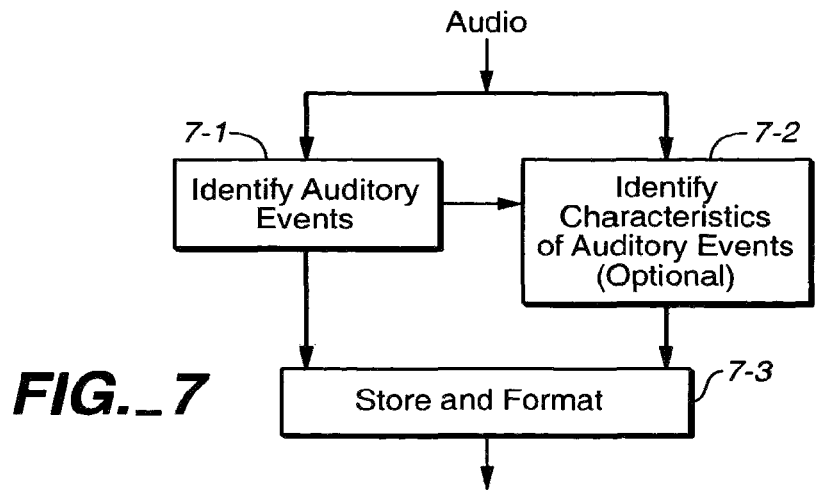
FIG._7
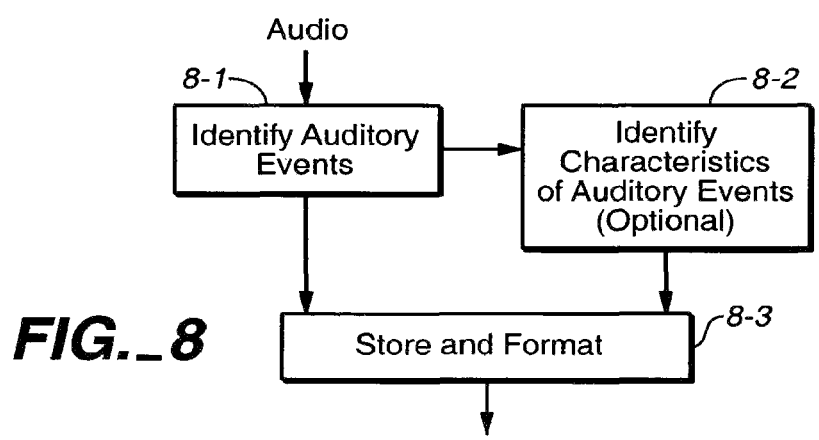
FIG._8
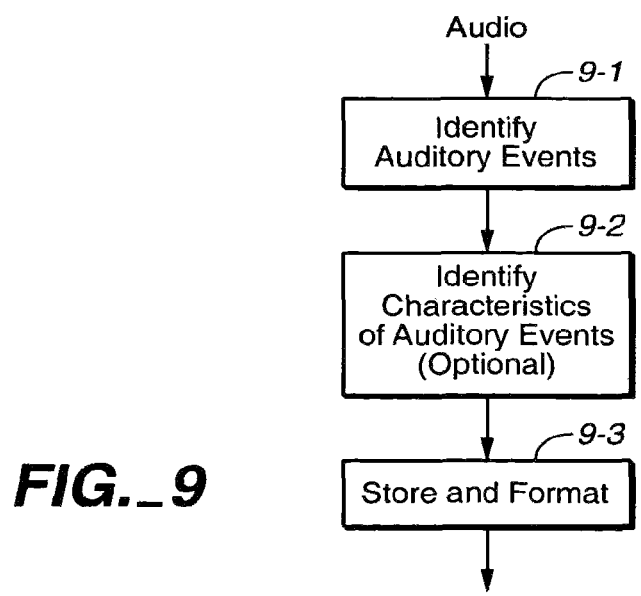
FIG._9

US 8,842,844 B2

SEGMENTING AUDIO SIGNALS INTO AUDITORY EVENTS

CROSS REFERENCES TO RELATED APPLICATIONS

This application is a continuation of U.S. patent application Ser. No. 12/724,969 filed on Mar. 16, 2010, which is a continuation of U.S. patent application Ser. No. 10/478,538 filed on Nov. 20, 2003, which is a National Stage of PCT application PCT/US02/05999 filed on Feb. 26, 2002. PCT application PCT/US02/05999 also claims the benefit of PCT/US02/04317 filed on Feb. 12, 2002, which is, in turn, a continuation-in-part of U.S. patent application Ser. No. 10/045,644 filed on Jan. 11, 2002, which is, in turn, a continuation-in-part of U.S. patent application Ser. No. 09/922,394 filed on Aug. 2, 2001, and which is, in turn, a continuation of U.S. patent application Ser. No. 09/834,739, filed Apr. 13, 2001. PCT application PCT/US02/05999 also claims the benefit of U.S. Provisional Application Ser. No. 60/351,498 filed on Jan. 23, 2002. PCT Application PCT/US02/05999 is a continuation-in-part of U.S. patent application Ser. No. 10/045,644 filed on Jan. 11, 2002 which is, in turn, a continuation-in-part of U.S. patent application Ser. No. 09/922,394 filed on Aug. 2, 2001, and which is, in turn, a continuation of U.S. patent application Ser. No. 09/834,739, filed Apr. 13, 2001. PCT application PCT/US02/05999 also claims the benefit of U.S. Provisional Application Ser. No. 60/293,825 filed on May 25, 2001.

TECHNICAL FIELD

The present invention pertains to the field of psychoacoustic processing of audio signals. In particular, the invention relates to aspects of dividing or segmenting audio signals into "auditory events," each of which tends to be perceived as separate and distinct, and to aspects of generating reduced-information representations of audio signals based on auditory events and, optionally, also based on the characteristics or features of audio signals within such auditory events. Auditory events may be useful as defining the MPEG-7 "Audio Segments" as proposed by the "ISO/IEC JTC 1/SC 29/WG 11."

BACKGROUND ART

The division of sounds into units or segments perceived as separate and distinct is sometimes referred to as "auditory event analysis" or "auditory scene analysis" ("ASA"). An extensive discussion of auditory scene analysis is set forth by Albert S. Bregman in his book *Auditory Scene Analysis—The Perceptual Organization of Sound*, Massachusetts Institute of Technology, 1991, Fourth printing, 2001, Second MIT Press paperback edition.) In addition, U.S. Pat. No. 6,002,776 to Bhadkamkar, et al, Dec. 14, 1999 cites publications dating back to 1976 as "prior art work related to sound separation by auditory scene analysis." However, the Bhadkamkar, et al patent discourages the practical use of auditory scene analysis, concluding that "[t]echniques involving auditory scene analysis, although interesting from a scientific point of view as models of human auditory processing, are currently far too computationally demanding and specialized to be considered practical techniques for sound separation until fundamental progress is made."

There are many different methods for extracting characteristics or features from audio. Provided the features or characteristics are suitably defined, their extraction can be performed using automated processes. For example "ISO/IEC JTC 1/SC 29/WG 11" (MPEG) is currently standardizing a variety of audio descriptors as part of the MPEG-7 standard. A common shortcoming of such methods is that they ignore auditory scene analysis. Such methods seek to measure, periodically, certain "classical" signal processing parameters such as pitch, amplitude, power, harmonic structure and spectral flatness. Such parameters, while providing useful information, do not analyze and characterize audio signals into elements perceived as separate and distinct according to human cognition. However, MPEG-7 descriptors may be useful in characterizing an Auditory Event identified in accordance with aspects of the present invention.

DISCLOSURE OF THE INVENTION

In accordance with aspects of the present invention, a computationally efficient process for dividing audio into temporal segments or "auditory events" that tend to be perceived as separate and distinct is provided. The locations of the boundaries of these auditory events (where they begin and end with respect to time) provide valuable information that can be used to describe an audio signal. The locations of auditory event boundaries can be assembled to generate a reduced-information representation, "signature, or "fingerprint" of an audio signal that can be stored for use, for example, in comparative analysis with other similarly generated signatures (as, for example, in a database of known works).

Bregman notes that "[w]e hear discrete units when the sound changes abruptly in timbre, pitch, loudness, or (to a lesser extent) location in space." (*Auditory Scene Analysis—The Perceptual Organization of Sound*, supra at page 469). Bregman also discusses the perception of multiple simultaneous sound streams when, for example, they are separated in frequency.

In order to detect changes in timbre and pitch and certain changes in amplitude, the audio event detection process according to an aspect of the present invention detects changes in spectral composition with respect to time. When applied to a multichannel sound arrangement in which the channels represent directions in space, the process according to an aspect of the present invention also detects auditory events that result from changes in spatial location with respect to time. Optionally, according to a further aspect of the present invention, the process may also detect changes in amplitude with respect to time that would not be detected by detecting changes in spectral composition with respect to time.

In its least computationally demanding implementation, the process divides audio into time segments by analyzing the entire frequency band (full bandwidth audio) or substantially the entire frequency band (in practical implementations, band limiting filtering at the ends of the spectrum is often employed) and giving the greatest weight to the loudest audio signal components. This approach takes advantage of a psychoacoustic phenomenon in which at smaller time scales (20 milliseconds (ms) and less) the ear may tend to focus on a single auditory event at a given time. This implies that while multiple events may be occurring at the same time, one component tends to be perceptually most prominent and may be processed individually as though it were the only event taking place. Taking advantage of this effect also allows the auditory event detection to scale with the complexity of the audio being processed. For example, if the input audio signal being processed is a solo instrument, the audio events that are identified will likely be the individual notes being played. Similarly for an input voice signal, the individual components of speech, the vowels and consonants for example, will likely be identified as individual audio elements. As the complexity of the audio increases, such as music with a drumbeat or multiple instruments and voice, the auditory event detection identifies the "most prominent" (i.e., the loudest) audio element at any given moment. Alternatively, the most prominent audio element may be determined by taking hearing threshold and frequency response into consideration.

While the locations of the auditory event boundaries computed from full-bandwidth audio provide useful information related to the content of an audio signal, it might be desired to provide additional information further describing the content of an auditory event for use in audio signal analysis. For example, an audio signal could be analyzed across two or more frequency subbands and the location of frequency subband auditory events determined and used to convey more detailed information about the nature of the content of an auditory event. Such detailed information could provide additional information unavailable from wideband analysis.

Thus, optionally, according to further aspects of the present invention, at the expense of greater computational complexity, the process may also take into consideration changes in spectral composition with respect to time in discrete frequency subbands (fixed or dynamically determined or both fixed and dynamically determined subbands) rather than the full bandwidth. This alternative approach would take into account more than one audio stream in different frequency subbands rather than assuming that only a single stream is perceptible at a particular time.

Even a simple and computationally efficient process according to aspects of the present invention has been found usefully to identify auditory events.

An auditory event detecting process according to the present invention may be implemented by dividing a time domain audio waveform into time intervals or blocks and then converting the data in each block to the frequency domain, using either a filter bank or a time-frequency transformation, such as the FFT. The amplitude of the spectral content of each block may be normalized in order to eliminate or reduce the effect of amplitude changes. Each resulting frequency domain representation provides an indication of the spectral content (amplitude as a function of frequency) of the audio in the particular block. The spectral content of successive blocks is compared and changes greater than a threshold may be taken to indicate the temporal start or temporal end of an auditory event. FIG. 1 shows an idealized waveform of a single channel of orchestral music illustrating auditory events. The spectral changes that occur as a new note is played trigger the new auditory events 2 and 3 at samples 2048 and 2560, respectively.

As mentioned above, in order to minimize the computational complexity, only a single band of frequencies of the time domain audio waveform may be processed, preferably either the entire frequency band of the spectrum (which may be about 50 Hz to 15 kHz in the case of an average quality music system) or substantially the entire frequency band (for example, a band defining filter may exclude the high and low frequency extremes).

Preferably, the frequency domain data is normalized, as is described below. The degree to which the frequency domain data needs to be normalized gives an indication of amplitude. Hence, if a change in this degree exceeds a predetermined threshold, that too may be taken to indicate an event boundary. Event start and end points resulting from spectral changes and from amplitude changes may be ORed together so that event boundaries resulting from either type of change are identified.

In the case of multiple audio channels, each representing a direction in space, each channel may be treated independently and the resulting event boundaries for all channels may then be ORed together. Thus, for example, an auditory event that abruptly switches directions will likely result in an "end of event" boundary in one channel and a "start of event" boundary in another channel. When ORed together, two events will be identified. Thus, the auditory event detection process of the present invention is capable of detecting auditory events based on spectral (timbre and pitch), amplitude and directional changes.

As mentioned above, as a further option, but at the expense of greater computational complexity, instead of processing the spectral content of the time domain waveform in a single band of frequencies, the spectrum of the time domain waveform prior to frequency domain conversion may be divided into two or more frequency bands. Each of the frequency bands may then be converted to the frequency domain and processed as though it were an independent channel in the manner described above. The resulting event boundaries may then be ORed together to define the event boundaries for that channel. The multiple frequency bands may be fixed, adaptive, or a combination of fixed and adaptive. Tracking filter techniques employed in audio noise reduction and other arts, for example, may be employed to define adaptive frequency bands (e.g., dominant simultaneous sine waves at 800 Hz and 2 kHz could result in two adaptively-determined bands centered on those two frequencies). Although filtering the data before conversion to the frequency domain is workable, more optimally the full bandwidth audio is converted to the frequency domain and then only those frequency subband components of interest are processed. In the case of converting the full bandwidth audio using the FFT, only sub-bins corresponding to frequency subbands of interest would be processed together.

Alternatively, in the case of multiple subbands or multiple channels, instead of ORing together auditory event boundaries, which results in some loss of information, the event boundary information may be preserved.

As shown in FIG. 2, the frequency domain magnitude of a digital audio signal contains useful frequency information out to a frequency of Fs/2 where Fs is the sampling frequency of the digital audio signal. By dividing the frequency spectrum of the audio signal into two or more subbands (not necessarily of the same bandwidth and not necessarily up to a frequency of Fs/2 Hz), the frequency subbands may be analyzed over time in a manner similar to a full bandwidth auditory event detection method.

The subband auditory event information provides additional information about an audio signal that more accurately describes the signal and differentiates it from other audio signals. This enhanced differentiating capability may be useful if the audio signature information is to be used to identify matching audio signals from a large number of audio signatures. For example, as shown in FIG. 2, a frequency subband auditory event analysis (with a auditory event boundary resolution of 512 samples) has found multiple subband auditory events starting, variously, at samples 1024 and 1536 and ending, variously, at samples 2560, 3072 and 3584. It is unlikely that this level of signal detail would be available from a single, wideband auditory scene analysis.

The subband auditory event information may be used to derive an auditory event signature for each subband. While this would increase the size of the audio signal's signature and possibly increase the computation time required to compare multiple signatures it could also greatly reduce the probability of falsely classifying two signatures as being the same. A tradeoff between signature size, computational complexity and signal accuracy could be done depending upon the application. Alternatively, rather than providing a signature for each subband, the auditory events may be ORed together to provide a single set of "combined" auditory event boundaries (at samples 1024, 1536, 2560, 3072 and 3584. Although this would result in some loss of information, it provides a single set of event boundaries, representing combined auditory events, that provides more information than the information of a single subband or a wideband analysis.

While the frequency subband auditory event information on its own provides useful signal information, the relationship between the locations of subband auditory events may be analyzed and used to provide more insight into the nature of an audio signal. For example, the location and strength of the subband auditory events may be used as an indication of timbre (frequency content) of the audio signal. Auditory events that appear in subbands that are harmonically related to one another would also provide useful insight regarding the harmonic nature of the audio. The presence of auditory events in a single subband may also provide information as to the tone-like nature of an audio signal. Analyzing the relationship of frequency subband auditory events across multiple channels can also provide spatial content information.

In the case of analyzing multiple audio channels, each channel is analyzed independently and the auditory event boundary information of each may either be retained separately or be combined to provide combined auditory event information. This is somewhat analogous to the case of multiple subbands. Combined auditory events may be better understood by reference to FIG. 3 that shows the auditory scene analysis results for a two channel audio signal. FIG. 3 shows time concurrent segments of audio data in two channels. ASA processing of the audio in a first channel, the top waveform of FIG. 3, identifies auditory event boundaries at samples that are multiples of the 512 sample spectral-profile block size, 1024 and 1536 samples in this example. The lower waveform of FIG. 3 is a second channel and ASA processing results in event boundaries at samples that are also multiples of the spectral-profile block size, at samples 1024, 2048 and 3072 in this example. A combined auditory event analysis for both channels results in combined auditory event segments with boundaries at samples 1024, 1536, 2048 and 3072 (the auditory event boundaries of the channels are "ORed" together). It will be appreciated that in practice the accuracy of auditory event boundaries depends on the size of the spectral-profile block size (N is 512 samples in this example) because event boundaries can occur only at block boundaries. Nevertheless, a block size of 512 samples has been found to determine auditory event boundaries with sufficient accuracy as to provide satisfactory results.

FIG. 3A shows three auditory events. These events include the (1) quiet portion of audio before the transient, (2) the transient event, and (3) the echo/sustain portion of the audio transient. A speech signal is represented in FIG. 3B having a predominantly high-frequency sibilance event, and events as the sibilance evolves or "morphs" into the vowel, the first half of the vowel, and the second half of the vowel.

FIG. 3 also shows the combined event boundaries when the auditory event data is shared across the time concurrent data blocks of two channels. Such event segmentation provides five combined auditory event regions (the event boundaries are ORed together).

FIG. 4 shows an example of a four channel input signal. Channels 1 and 4 each contain three auditory events and channels 2 and 3 each contain two auditory events. The combined auditory event boundaries for the concurrent data blocks across all four channels are located at sample numbers 512, 1024, 1536, 2560 and 3072 as indicated at the bottom of the FIG. 4.

In principle, the processed audio may be digital or analog and need not be divided into blocks. However, in practical applications, the input signals likely are one or more channels of digital audio represented by samples in which consecutive samples in each channel are divided into blocks of, for example 4096 samples (as in the examples of FIGS. 1, 3 and 4, above). In practical embodiments set forth herein, auditory events are determined by examining blocks of audio sample data preferably representing approximately 20 ms of audio or less, which is believed to be the shortest auditory event recognizable by the human ear. Thus, in practice, auditory events are likely to be determined by examining blocks of, for example, 512 samples, which corresponds to about 11.6 ms of input audio at a sampling rate of 44.1 kHz, within larger blocks of audio sample data. However, throughout this document reference is made to "blocks" rather than "subblocks" when referring to the examination of segments of audio data for the purpose of detecting auditory event boundaries. Because the audio sample data is examined in blocks, in practice, the auditory event temporal start and stop point boundaries necessarily will each coincide with block boundaries. There is a trade off between real-time processing requirements (as larger blocks require less processing overhead) and resolution of event location (smaller blocks provide more detailed information on the location of auditory events).

Other aspects of the invention will be appreciated and understood as the detailed description of the invention is read and understood.

BRIEF DESCRIPTION OF THE DRAWINGS

FIG. 1 is an idealized waveform of a single channel of orchestral music illustrating auditory.

FIG. 2 is an idealized conceptual schematic diagram illustrating the concept of dividing full bandwidth audio into frequency subbands in order to identify subband auditory events. The horizontal scale is samples and the vertical scale is frequency.

FIG. 3 is a series of idealized waveforms in two audio channels, showing audio events in each channel and combined audio events across the two channels.

FIG. 4 is a series of idealized waveforms in four audio channels showing audio events in each channel and combined audio events across the four channels.

FIG. 5 is a flow chart showing the extraction of audio event locations and the optional extraction of dominant subbands from an audio signal in accordance with the present invention.

FIG. 6 is a conceptual schematic representation depicting spectral analysis in accordance with the present invention.

FIGS. 7-9 are flow charts showing more generally three alternative arrangements equivalent to the flow chart of FIG. 5.

DETAILED DESCRIPTION OF THE PREFERRED EMBODIMENTS

In accordance with an embodiment of one aspect of the present invention, auditory scene analysis is composed of three general processing steps as shown in a portion of FIG. 5. The first step 5-1 ("Perform Spectral Analysis") takes a time-domain audio signal, divides it into blocks and calculates a spectral profile or spectral content for each of the blocks. Spectral analysis transforms the audio signal into the short-term frequency domain. This can be performed using any filterbank, either based on transforms or banks of bandpass filters, and in either linear or warped frequency space (such as the Bark scale or critical band, which better approximate the characteristics of the human ear). With any filterbank there exists a tradeoff between time and frequency. Greater time resolution, and hence shorter time intervals, leads to lower frequency resolution. Greater frequency resolution, and hence narrower subbands, leads to longer time intervals.

The first step, illustrated conceptually in FIG. 6 calculates the spectral content of successive time segments of the audio signal. In a practical embodiment, the ASA block size is 512 samples of the input audio signal. In the second step 5-2, the differences in spectral content from block to block are determined ("Perform spectral profile difference measurements"). Thus, the second step calculates the difference in spectral content between successive time segments of the audio signal. As discussed above, a powerful indicator of the beginning or end of a perceived auditory event is believed to be a change in spectral content. In the third step 5-3 ("Identify location of auditory event boundaries"), when the spectral difference between one spectral-profile block and the next is greater than a threshold, the block boundary is taken to be an auditory event boundary. The audio segment between consecutive boundaries constitutes an auditory event. Thus, the third step sets an auditory event boundary between successive time segments when the difference in the spectral profile content between such successive time segments exceeds a threshold, thus defining auditory events. In this embodiment, auditory event boundaries define auditory events having a length that is an integral multiple of spectral profile blocks with a minimum length of one spectral profile block (512 samples in this example). In principle, event boundaries need not be so limited. As an alternative to the practical embodiments discussed herein, the input block size may vary, for example, so as to be essentially the size of an auditory event.

The locations of event boundaries may be stored as a reduced-information characterization or "signature" and formatted as desired, as shown in step 5-4. An optional process step 5-5 ("Identify dominant subband") uses the spectral analysis of step 5-1 to identify a dominant frequency subband that may also be stored as part of the signature. The dominant subband information may be combined with the auditory event boundary information in order to define a feature of each auditory event.

Either overlapping or non-overlapping segments of the audio may be windowed and used to compute spectral profiles of the input audio. Overlap results in finer resolution as to the location of auditory events and, also, makes it less likely to miss an event, such as a transient. However, overlap also increases computational complexity. Thus, overlap may be omitted. FIG. 6 shows a conceptual representation of non-overlapping 512 sample blocks being windowed and transformed into the frequency domain by the Discrete Fourier Transform (DFT). Each block may be windowed and transformed into the frequency domain, such as by using the DFT, preferably implemented as a Fast Fourier Transform (FFT) for speed.

The following variables may be used to compute the spectral profile of the input block:

N=number of samples in the input signal
M=number of windowed samples in a block used to compute spectral profile
P=number of samples of spectral computation overlap
Q=number of spectral windows/regions computed In general, any integer numbers may be used for the variables above. However, the implementation will be more efficient if M is set equal to a power of 2 so that standard FFTs may be used for the spectral profile calculations. In addition, if N, M, and P are chosen such that Q is an integer number, this will avoid under-running or over-running audio at the end of the N samples. In a practical embodiment of the auditory scene analysis process, the parameters listed may be set to:

M=512 samples (or 11.6 ms at 44.1 kHz)
P=0 samples (no overlap)

The above-listed values were determined experimentally and were found generally to identify with sufficient accuracy the location and duration of auditory events. However, setting the value of P to 256 samples (50% overlap) rather than zero samples (no overlap) has been found to be useful in identifying some hard-to-find events. While many different types of windows may be used to minimize spectral artifacts due to windowing, the window used in the spectral profile calculations is an M-point Hanning, Kaiser-Bessel or other suitable, preferably non-rectangular, window. The above-indicated values and a Hanning window type were selected after extensive experimental analysis as they have shown to provide excellent results across a wide range of audio material. Non-rectangular windowing is preferred for the processing of audio signals with predominantly low frequency content. Rectangular windowing produces spectral artifacts that may cause incorrect detection of events. Unlike certain encoder/decoder (codec) applications where an overall overlap/add process must provide a constant level, such a constraint does not apply here and the window may be chosen for characteristics such as its time/frequency resolution and stop-band rejection.

In step 5-1 (FIG. 5), the spectrum of each M-sample block may be computed by windowing the data by an M-point Hanning, Kaiser-Bessel or other suitable window, converting to the frequency domain using an M-point Fast Fourier Transform, and calculating the magnitude of the complex FFT coefficients. The resultant data is normalized so that the largest magnitude is set to unity, and the normalized array of M numbers is converted to the log domain. The array need not be converted to the log domain, but the conversion simplifies the calculation of the difference measure in step 5-2. Furthermore, the log domain more closely matches the nature of the human auditory system. The resulting log domain values have a range of minus infinity to zero. In a practical embodiment, a lower limit can be imposed on the range of values; the limit may be fixed, for example –60 dB, or be frequency-dependent to reflect the lower audibility of quiet sounds at low and very high frequencies. (Note that it would be possible to reduce the size of the array to M/2 in that the FFT represents negative as well as positive frequencies).

Step 5-2 calculates a measure of the difference between the spectra of adjacent blocks. For each block, each of the M (log) spectral coefficients from step 5-1 is subtracted from the corresponding coefficient for the preceding block, and the magnitude of the difference calculated (the sign is ignored). These M differences are then summed to one number. Hence, for a contiguous time segment of audio, containing Q blocks, the result is an array of Q positive numbers, one for each block. The greater the number, the more a block differs in spectrum from the preceding block. This difference measure may also be expressed as an average difference per spectral coefficient by dividing the difference measure by the number of spectral coefficients used in the sum (in this case M coefficients).

Step 5-3 identifies the locations of auditory event boundaries by applying a threshold to the array of difference measures from step 5-2 with a threshold value. When a difference measure exceeds a threshold, the change in spectrum is deemed sufficient to signal a new event and the block number of the change is recorded as an event boundary. For the values of M and P given above and for log domain values (in step 5-1) expressed in units of dB, the threshold may be set equal to 2500 if the whole magnitude FFT (including the mirrored part) is compared or 1250 if half the FFT is compared (as noted above, the FFT represents negative as well as positive frequencies—for the magnitude of the FFT, one is the mirror image of the other). This value was chosen experimentally and it provides good auditory event boundary detection. This parameter value may be changed to reduce (increase the threshold) or increase (decrease the threshold) the detection of events.

For an audio signal consisting of Q blocks (of size M samples), the output of step 5-3 of FIG. 5 may be stored and formatted in step 5-4 as an array B(q) of information representing the location of auditory event boundaries where q=0, 1, ..., Q−1. For a block size of M=512 samples, overlap of P=0 samples and a signal-sampling rate of 44.1 kHz, the auditory scene analysis function 2 outputs approximately 86 values a second. The array B(q) may stored as a signature, such that, in its basic form, without the optional dominant subband frequency information of step 5-5, the audio signal's signature is an array B(q) representing a string of auditory event boundaries.

Identify Dominant Subband (Optional)

For each block, an optional additional step in the processing of FIG. 5 is to extract information from the audio signal denoting the dominant frequency "subband" of the block (conversion of the data in each block to the frequency domain results in information divided into frequency subbands). This block-based information may be converted to auditory-event based information, so that the dominant frequency subband is identified for every auditory event. Such information for every auditory event provides information regarding the auditory event itself and may be useful in providing a more detailed and unique reduced-information representation of the audio signal. The employment of dominant subband information is more appropriate in the case of determining auditory events of full bandwidth audio rather than cases in which the audio is broken into subbands and auditory events are determined for each subband.

The dominant (largest amplitude) subband may be chosen from a plurality of subbands, three or four, for example, that are within the range or band of frequencies where the human ear is most sensitive. Alternatively, other criteria may be used to select the subbands. The spectrum may be divided, for example, into three subbands. Useful frequency ranges for the subbands are (these particular frequencies are not critical):

| Subband 1 | 300 Hz to 550 Hz |
| Subband 2 | 550 Hz to 2000 Hz |
| Subband 3 | 2000 Hz to 10,000 Hz |

To determine the dominant subband, the square of the magnitude spectrum (or the power magnitude spectrum) is summed for each subband. This resulting sum for each subband is calculated and the largest is chosen. The subbands may also be weighted prior to selecting the largest. The weighting may take the form of dividing the sum for each subband by the number of spectral values in the subband, or alternatively may take the form of an addition or multiplication to emphasize the importance of a band over another. This can be useful where some subbands have more energy on average than other subbands but are less perceptually important.

Considering an audio signal consisting of Q blocks, the output of the dominant subband processing is an array DS(q) of information representing the dominant subband in each block (q=0, 1, ..., Q−1). Preferably, the array DS(q) is formatted and stored in the signature along with the array B(q). Thus, with the optional dominant subband information, the audio signal's signature is two arrays B(q) and DS(q), representing, respectively, a string of auditory event boundaries and a dominant frequency subband within each block, from which the dominant frequency subband for each auditory event may be determined if desired. Thus, in an idealized example, the two arrays could have the following values (for a case in which there are three possible dominant subbands).

| 1 | 0 | 1 | 0 | 0 | 0 | 1 | 0 | 0 | 1 | 0 | 0 | 0 | 0 | 0 | 1 | 0 | (Event Boundaries) |
| 1 | 1 | 2 | 2 | 2 | 2 | 1 | 1 | 1 | 3 | 3 | 3 | 3 | 3 | 3 | 1 | 1 | (Dominant Subbands) |

In most cases, the dominant subband remains the same within each auditory event, as shown in this example, or has an average value if it is not uniform for all blocks within the event. Thus, a dominant subband may be determined for each auditory event and the array DS(q) may be modified to provide that the same dominant subband is assigned to each block within an event.

The process of FIG. 5 may be represented more generally by the equivalent arrangements of FIGS. 7, 8 and 9. In FIG. 7, an audio signal is applied in parallel to an "Identify Auditory Events" function or step 7-1 that divides the audio signal into auditory events, each of which tends to be perceived as separate and distinct and to an optional "Identify Characteristics of Auditory Events" function or step 7-2. The process of FIG. 5 may be employed to divide the audio signal into auditory events or some other suitable process may be employed. The auditory event information, which may be an identification of auditory event boundaries, determined by function or step 7-1 is stored and formatted, as desired, by a "Store and Format" function or step 7-3. The optional "Identify Characteristics" function or step 7-3 also receives the auditory event information. The "Identify Characteristics" function or step 7-3 may characterize some or all of the auditory events by one or more characteristics. Such characteristics may include an identification of the dominant subband of the auditory event, as described in connection with the process of FIG. 5. The characteristics may also include one or more of the MPEG-7 audio descriptors, including, for example, a measure of power of the auditory event, a measure of amplitude of the auditory event, a measure of the spectral flatness of the auditory event, and whether the auditory event is substantially silent. The characteristics may also include other characteristics such as whether the auditory event includes a transient. Characteristics for one or more auditory events are also received by the "Store and Format" function or step 7-3 and stored and formatted along with the auditory event information.

Alternatives to the arrangement of FIG. 7 are shown in FIGS. 8 and 9. In FIG. 8 block 8-1, 8-2 and 8-3 correspond, respectively, to blocks 7-1, 7-2 and 7-3, described above except that block 8-2 does not receive an audio input as does block 7-2. Thus, FIG. 8, the audio input signal is not applied directly to the "Identify Characteristics" function or step 8-2, but block 8-2 does receive information from the "Identify Auditory Events" function or step 8-1. The arrangement of FIG. 5 is a specific example of such an arrangement. In FIG. 9, the functions or steps 9-1, 9-2 and 9-3 are arranged in series. Blocks 9-1, 9-2 and 9-3 correspond, respectively, to blocks 7-1 (except that provides only a single output instead of two outputs), 8-2 and 7-3 (except that it receives one input rather than two).

The details of this practical embodiment are not critical. Other ways to calculate the spectral content of successive time segments of the audio signal, calculate the differences between successive time segments, and set auditory event boundaries at the respective boundaries between successive time segments when the difference in the spectral profile content between such successive time segments exceeds a threshold may be employed.

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

The present invention and its various aspects may be implemented as software functions performed in digital signal processors, programmed general-purpose digital computers, and/or special purpose digital computers. Interfaces between analog and digital signal streams may be performed in appropriate hardware and/or as functions in software and/or firmware.

The invention claimed is:

1. A method for processing a multi-channel audio signal, the method comprising:
   analyzing time concurrent samples of the multi-channel audio signal across at least two channels to determine auditory event boundaries in the at least two channels;
   identifying auditory event boundaries in the at least two channels, wherein an auditory event is between adjacent auditory event boundaries, and each auditory event boundary represents an end of a preceding auditory event and a beginning of a next auditory event; and
   identifying a combined auditory event boundary for the multi-channel audio signal in response to "OR"ing the identified auditory event boundaries in the at least two channels, wherein neither auditory event boundaries nor auditory events are known in advance of the identifying auditory event boundaries in the at least two channels of the multi-channel audio signal.

2. The method of claim 1 wherein at least one of the auditory event boundaries divides: (i) a portion of audio signal quiet relative to a transient and (ii) the transient.

3. The method of claim 1 wherein at least one of the auditory events is silent.

4. The method of claim 1 wherein a block of the time concurrent samples represents less than 20 milliseconds of audio.

5. The method of claim 1 wherein samples of the multi-channel audio signal represent speech.

6. The method of claim 5 wherein a component of the speech is identified as an auditory event.

7. The method of claim 1 wherein the analyzing provides content information of at least one of the auditory events.

8. The method of claim 1 wherein the multi-channel audio signal consists of only two channels of audio content.

9. The method of claim 1 wherein the multi-channel audio signal includes at least two channels of audio content.

10. A non-transitory computer readable medium that contains instructions that when executed by a processor cause the processor to perform the method of claim 1.

* * * * *